(12) United States Patent
Barjon et al.

(10) Patent No.: US 11,065,924 B2
(45) Date of Patent: Jul. 20, 2021

(54) DEVICE FOR ATTACHING AN ELECTRONIC MEMBER TO A PNEUMATIC TIRE

(71) Applicant: COMPAGNIE GENERALE DES ETABLISSEMENTS MICHELIN, Clermont-Ferrand (FR)

(72) Inventors: Stéphane Barjon, Clermont-Ferrand (FR); Yann Palheire, Clermont-Ferrand (FR)

(73) Assignee: COMPAGNIE GENERALE DES ETABLISSMENTS MICHELIN, Clermont-Ferrand (FR)

( * ) Notice: Subject to any disclaimer, the term of this patent is extended or adjusted under 35 U.S.C. 154(b) by 158 days.

(21) Appl. No.: 16/486,704

(22) PCT Filed: Feb. 15, 2018

(86) PCT No.: PCT/FR2018/050364
§ 371 (c)(1),
(2) Date: Aug. 16, 2019

(87) PCT Pub. No.: WO2018/150141
PCT Pub. Date: Aug. 23, 2018

(65) Prior Publication Data
US 2020/0055354 A1 Feb. 20, 2020

(30) Foreign Application Priority Data

Feb. 17, 2017 (FR) ..................................... 1770154

(51) Int. Cl.
*B60C 23/04* (2006.01)
(52) U.S. Cl.
CPC ...... *B60C 23/0493* (2013.01); *B60C 23/0433* (2013.01); *B60C 23/0486* (2013.01)

(58) Field of Classification Search
USPC .................................................. 73/146–146.8
See application file for complete search history.

(56) References Cited

U.S. PATENT DOCUMENTS 5,613,819 A * 3/1997 Wehren .................. G01D 11/30
411/527
6,309,494 B1 * 10/2001 Koch .................. B60C 23/0493
156/153

(Continued)

FOREIGN PATENT DOCUMENTS

DE 10 2014 206 463 A1 10/2015
EP 1 598 218 A1 11/2005

(Continued)

OTHER PUBLICATIONS

International Search Report dated Apr. 26, 2018, in corresponding PCT/FR2018/050364 (4 pages).

*Primary Examiner* — Andre J Allen
(74) *Attorney, Agent, or Firm* — Venable LLP

(57) ABSTRACT

A device (10) for securing an electronic member to a wall of a tire casing comprises a base (11) that is able to be secured to the wall (2) of a tire casing, a retaining wall (12), connected to the base (11), the interior surfaces (14, 15) of which define a volume (13) able to accommodate the electronic member, and a clamping system (20) for clamping the retaining wall (12), able to prevent any extraction of the electronic member. The securing device (10) is such that the retaining wall (12), which is able to deform elastically, comprises an opening (18) that allows the electronic member to be extracted and inserted. The retaining wall (12) on its external surface (17) has a retaining device (19) for the clamping system (20). Finally, the clamping system (20) is a single-use system.

14 Claims, 2 Drawing Sheets

(56) References Cited

U.S. PATENT DOCUMENTS

| | | | |
|---|---|---|---|
| 6,952,955 B1* | 10/2005 | Uleski | B60C 23/0408 |
| | | | 73/146 |
| 7,347,088 B2 | 3/2008 | Shimura | |
| 9,834,044 B2 | 12/2017 | Luce | |
| 10,071,606 B2 | 9/2018 | Hartmann et al. | |
| 2006/0059982 A1 | 3/2006 | Shimura | |
| 2006/0220816 A1* | 10/2006 | Scheungraber | G06K 19/07764 |
| | | | 340/447 |
| 2009/0101257 A1 | 4/2009 | Brusarosco et al. | |
| 2009/0173422 A1* | 7/2009 | Utsumi | B60C 23/0493 |
| | | | 152/510 |
| 2009/0183562 A1* | 7/2009 | Brusarosco | B60C 23/0493 |
| | | | 73/146.5 |
| 2010/0186493 A1* | 7/2010 | Brusarosco | B60C 23/0411 |
| | | | 73/146.3 |
| 2011/0315292 A1* | 12/2011 | Gougnaud | B60C 23/0493 |
| | | | 152/450 |
| 2014/0352420 A1 | 12/2014 | Brusarosco et al. | |
| 2016/0053925 A1* | 2/2016 | Dohi | G01L 9/0051 |
| | | | 285/337 |
| 2016/0229237 A1 | 8/2016 | Luce | |
| 2017/0015152 A1 | 1/2017 | Hartmann et al. | |
| 2017/0355237 A1* | 12/2017 | Agarwal | H05K 5/0204 |
| 2018/0038770 A1* | 2/2018 | Osawa | G01L 19/142 |
| 2018/0361804 A1* | 12/2018 | Wei | B29D 30/0061 |
| 2019/0176547 A1* | 6/2019 | Sakakibara | B60C 23/0493 |
| 2019/0381841 A1* | 12/2019 | Barjon | B60C 23/0493 |

FOREIGN PATENT DOCUMENTS

| | | |
|---|---|---|
| EP | 3020577 A1 | 5/2016 |
| WO | 2013/098711 A1 | 7/2013 |

* cited by examiner

DEVICE FOR ATTACHING AN ELECTRONIC MEMBER TO A PNEUMATIC TIRE

FIELD OF THE INVENTION

The present invention relates to a device for securing to a tyre casing an electronic member concerned with measuring parameters pertaining to the tyre casing.

TECHNOLOGICAL BACKGROUND

The development of electronic units integrated into mounted assemblies, comprising a tyre casing and a wheel, has intensified over the last few years. In effect, these electronic units measure parameters pertaining to the mounted assembly such as the temperature or inflation pressure inside the cavity formed by the tyre casing and the wheel rim in a mounted, inflated state. These parameters are essential to safe use of the mounted assembly. The functionalities offered by these electronic members are now starting to increase, thereby increasing the number of parameters taken into consideration. Communication with these electronic units, in particular in order to communicate the parameters of the mounted assembly, is generally achieved by way of radiofrequency transmission to transmitter/receiver devices.

These new functionalities mean that new services that can be offered to the end-customer can now be developed. The quality of the services offered depends greatly on the quality of the parameters measured and transmitted. Naturally, the quality of the measurement taken is very closely linked with the structural and functional components of the electronic member. As a result, it is essential to take the inviolability of this electronic member into consideration in order to assure the quality of the services offered therewith.

This electronic member may be small enough that it can be integrated into the very structure of a tyre casing, being, for example a passive RFID (Radio Frequency IDentification) transponder. However, in most cases, these electronic members are active members and are attached to the components of the mounted assembly using a securing device. As a result, the inviolability of the electronic member is then assured primarily by the inviolability of the securing device that attaches the electronic member to the tyre casing in particular. Of course the securing device must also meet many other requirements such as the thermomechanical endurance under use conditions, the endurance of the tyre casing, the radiofrequency communication performance, etc.

Document WO201398711A1 describes a device for securing the electronic member that makes it possible to irreversibly retain the electronic member on the tyre casing without it being possible to substitute or modify it. However, the life of the electronic members, of the active type for example, is limited on account, for example, of the energy capacity with which they are provided. Thus, it is only possible to hold the electronic member in order to change its battery or to benefit from a new development of the electronic system either by first of all destroying the physical connection between the securing device and the tyre casing or by damaging the securing device in order to extract the initial electronic member. Changing the electronic member then requires a second step for securing a new securing device with the new electronic member inserted into the new securing device. The first step that can damage the structure of the tyre has to be carried out by qualified personnel. This process is difficult and requires a period of immobilization of the tyre casing, which is detrimental as regards the degree of usage of the tyre casing.

It is one of the objects of the following invention to address the problems of holding electronic members while preserving the inviolability of the securing device, and maintaining a compromise with the other functionalities of the securing device such as, for example, the thermomechanical endurance of the securing device, the endurance of the tyre casing, and the effectiveness of the radiofrequency communication of the electronic member.

In order to gain a better understanding of the invention, what is meant here by the circumferential S, axial A and radial R directions, are directions defined with respect to the rotating frame of reference of the tyre casing about its natural axis of rotation. The radial direction R is the direction extending away from the natural axis of rotation and perpendicularly thereto. The axial direction A is the direction parallel to the natural axis of rotation. Finally, the circumferential direction S forms a direct trihedron with the predefined radial and axial directions.

SUMMARY OF THE INVENTION

The invention relates to a device for securing an electronic member to a wall of a tyre casing, comprising a base that is able to be secured to the wall of the tyre casing, a retaining wall, connected to the base and, with the base, defining a volume able to accommodate the electronic member, and a clamping system for clamping the retaining wall, able to prevent any extraction of the electronic member. The volume is delimited by the interior surfaces of the base and of the retaining wall. This securing device is characterized in that the retaining wall, which is able to deform elastically, comprises an opening that allows the electronic member to be extracted and inserted, in that the retaining wall on its external surface has at least one retaining device for a clamping system for clamping the retaining wall, and in that the clamping system for clamping the retaining wall is a single-use system.

First of all, the retaining wall has an opening through which the electronic member is extracted or inserted while holding the securing device secured to the wall of the tyre casing. This operation of handling the electronic member is possible on account of the elastic deformation of the retaining wall. Thus, it is possible to change the electronic member on account of the accessibility and the size of the opening. The inviolability of the securing device thus attached to the wall of the tyre casings ensured, on the one hand, by the single-use clamping system that clamps the retaining wall and, on the other hand, by the retaining device for this clamping system, which is present on the retaining wall. Specifically, what is meant here by "single-use clamping system" is that removal of the clamping system can be performed only with at least partial destruction thereof. Specifically, the latter is held in place on the securing device by way of the retaining device present on the retaining wall. The only possibility of removing the clamping system without damaging the various elements of the securing device consists in breaking the clamping system. This operation is for example possible at the retaining device which has a separation at the opening of the retaining wall. However, any other means, such as a recessed cavity in the retaining wall, the dimension of which is greater than the clamping system and which is located in line with the clamping system, may ensure this function. Thus, any action of extracting or inserting an electronic member into the securing device first of all requires the destruction of the single-use clamping system. In addition, in order to limit the risk of inadvertent ejection of the electronic member from the securing device, it is necessary to fit a new single-use clamping system in place of the old one. Specifically, the presence of the single-use clamping system in the retaining device prevents the maximum travel of the separated parts of the retaining wall, thereby minimizing the space offered compared with the phases of extraction or insertion of the electronic member in which the single-use clamping system is absent.

According to one preferred embodiment, with the opening defining a lip on each disjointed structure of the retaining wall, the clamping system is able to bring together the lips of the opening at the retaining device.

In order to prevent any extraction of the electronic member from the retaining wall, the clamping system ensures that the disjointed structures of the retaining wall are spaced apart at the retaining device. The retaining device in this configuration is passed through by the opening. As a result, the opening allows the unfurling of the disjointed structures of the retaining wall that are situated above the retaining device with respect to the direction normal to the base. This unfurling corresponds to partial unfurling of the disjointed structures.

According to one particular embodiment, the retaining wall comprises N through-orifices, N being greater than or equal to 2.

These orifices that pass through the retaining wall have a first role of placing the volume of the internal cavity of the mounted assembly, as delimited by the wheel and the tyre casing, in communication with the interior volume of the securing device. Thus, the physical parameters such as the pressure and the temperature are equal between the internal cavity of the mounted assembly and the cavity of the securing device. As a result, the sensors of the electronic member which are situated inside the cavity of the securing device and measure such parameters, give reliable information as to the parameters pertaining to the mounted assembly.

In addition, these through-orifices may also serve as stopping points to halt the opening of the retaining wall. Specifically, if the opening of the retaining wall ends in an orifice, the mechanical stresses are spread over the entire contour of the orifice. This reduces the overstress phenomena that bring about the initiation and propagation of cracks in the materials in the solid state.

According to one very particular embodiment, the through-orifices have a cross section with continuous curvature.

The continuity of the curvature of these orifices encourages uniformity of the mechanical stresses on the contour of the orifice making it possible to limit excessively high stress concentrations. As a result, the risk of initiating and propagation of a crack at the retaining wall is limited.

According to one very particular embodiment, any point on the cross section of the through-orifices has a radius of curvature greater than or equal to 1 millimetre.

The orifice is then of significant size so that it can act as an effective stopping point, halting the opening and therefore the tear in the retaining wall. In this first scenario in which the width of the opening is smaller than the dimension of the orifice for example of 1 millimetre, the opening opens into the larger-sized orifice thereby reducing the mechanical stresses by spreading them uniformly over a larger surface. In the second scenario in which the opening has a width that is greater than the main dimension of the orifice, the end of the opening, which is potentially in the form of an isolated point before it opens into the orifice, becomes a surface with continuous curvature, thus reducing the mechanical stresses. However, in this second scenario, the reduction in mechanical stresses is not as great as in the first scenario.

Advantageously, the retaining device for the single-use clamping system that clamps the retaining wall comprises an element comprised in the group including grooves and channels.

The retaining device allows the single-use clamping system to be housed in complete security. In the case of a groove, the single-use clamping system is positioned vertically lower than the groove, making natural removal of the single-use clamping system impossible. In the case of a channel, fitting the single-use clamping system in the channel prevents natural removal of that system.

According to one preferred embodiment, the retaining device for the single-use clamping system that clamps the retaining wall is partially continuous.

There is no need, even if such a measure is recommended, for the retaining device to be continuous in order to perform its function of holding the single-use clamping system in place while limiting the mechanical stresses generated by the contact forces. For example, it is enough for it to be continuous in parts in order for it to perform its function.

According to a very preferred embodiment, with the volume housing the electronic member positioned in the securing device being inscribed inside a right cylinder that is upright about an axis, referred to as the reference axis, of height 2H with respect to the interior surface of the base, and of diameter 2R, the retaining device for the single-use clamping system that clamps the retaining wall extends circumferentially over an angular sector of at least 90 degrees about the reference axis, preferably over an angular sector of 180 degrees.

Ensuring that at least one quarter of the periphery of the single-use clamping system is anchored within the retaining device is enough to ensure the functionality of holding the latter on the securing device. In order to limit excessive mechanical stresses, it is preferable for the contact zone to extend over half the periphery. Ideally, even distribution of the retaining device over the full periphery of the securing device would be preferable.

According to one preferred embodiment, with the volume housing the electronic member positioned in the securing device being inscribed inside a right cylinder that is upright about an axis, referred to as the reference axis, of height 2H with respect to the interior surface of the base, and of diameter 2R, the retaining device for the single-use clamping system that clamps the retaining wall is situated at a radial distance greater than or equal to R away from the reference axis and at a vertical distance greater than or equal to H away from the interior surface of the base.

It is assured in this configuration that the retaining device lies on the upper part of the electronic member, making it possible to perform an effective action of retaining the electronic member by clamping the retaining wall onto this member. As a result, the risk of inadvertent ejection of the electronic member from the securing device through the opening in the retaining wall is limited.

In one preferred embodiment, the retaining device for the single-use clamping system that clamps the retaining wall comprises a cavity able to house at least part of the single-use clamping system that clamps the retaining wall.

Thus, the retaining device comprises a dedicated housing to accommodate the single-use clamping system. Moreover, this cavity represents a natural hinge, in the absence of the single-use clamping system, for enlarging the space of the opening during operations of inserting and of extracting the electronic member. Finally, the presence of the clamping system in this cavity then reduces the natural range of travel of the elements of the retaining wall split by the opening. As a consequence, the risk of inadvertent ejection of the electronic member through the opening is reduced. Preferably, the cavity of the retaining device has a cross section with continuous curvature in order to minimize the stress concentrations so as to improve the life of the securing device.

According to a highly preferred embodiment, the cavity of the retaining device for the clamping system that clamps the retaining wall has a cross section that accommodates at least 40% of the cross section of the single-use clamping system.

A proportion of the single-use clamping system perfectly occupies the volume offered by the retaining device. On the one hand, this prevents the single-use clamping system from being mechanically removed without damaging the surrounding elements. And on the other hand, it greatly reduces the functionality of the mechanical hinge afforded by the cavity, thus limiting the risk of the electronic member being ejected out of the securing device while increasing the unfurling of the disjointed structures of the retaining wall in the absence of the single-use clamping system in the cavity.

According to a very preferred embodiment, the single-use clamping system that clamps the retaining wall comprises a tightenable ring.

The clamping system is single-use because the ring is naturally closed and removing it entails breaking the ring at least at one point. Moreover, the tightenable nature of the clamping system prevents it from being removed when it is in place. As a preference, the cross section of the ring has continuous curvature making it possible to limit the discontinuities that introduce stress concentrations both into the clamping system and into the parts in contact, with a tendency to reduce the life of the ring and of the retaining wall.

According to one highly preferred embodiment, the base of the securing device comprises at least one marker situated on the vertically upper part of the base.

The presence of this marker allows the securing device to be orientated correctly with respect to the wall of the tyre casing in instances in which the functionalities of the electronic member require this, such as, for example, the various components of acceleration in preferred directions of the tyre casing.

These markers, which are visible geometric details, are comprised within the group including lug, notch, boss, recess. These markers are readily identifiable using an optical camera looking from above, the face of the securing device being visually accessible, allowing the operation of placing the securing device on the wall of the tyre casing to be automated.

Advantageously, the securing device is made using an elastomer material.

The hyperelasticity properties of elastomer materials encourage elastic deformation of the securing device allowing the electronic member to be inserted and extracted with respect to the securing device. In addition, because the wall of the tyre casing is generally not planar, the elasticity of these materials makes it possible to create an effective surface for bonding between the base and the wall of the tyre casing.

Among elastomer materials, rubber compounds based on saturated or unsaturated diene elastomers such as butyl, SBR, polybutadiene; natural rubber; and polyisoprene are good candidates because of their compatibility with the rubber compounds of the tyre casing. These rubber compounds do not impair the radiofrequency communication performance of the electronic members because they are natural electrical insulators the insulating property of which can be adjusted through the use of greater or lesser amounts of conducting fillers.

The advantage of butyl is that it has an excellent resistance to oxidation. It is also possible to use as elastomer an EPDM (ethylene propylene diene monomer rubber).

BRIEF DESCRIPTION OF THE DRAWINGS

The invention will be better understood upon reading the following description, given solely by way of nonlimiting example and with reference to the appended figures, throughout which the same reference numerals denote identical parts, and in which.

DETAILED DESCRIPTION OF EMBODIMENTS

Figure 1:
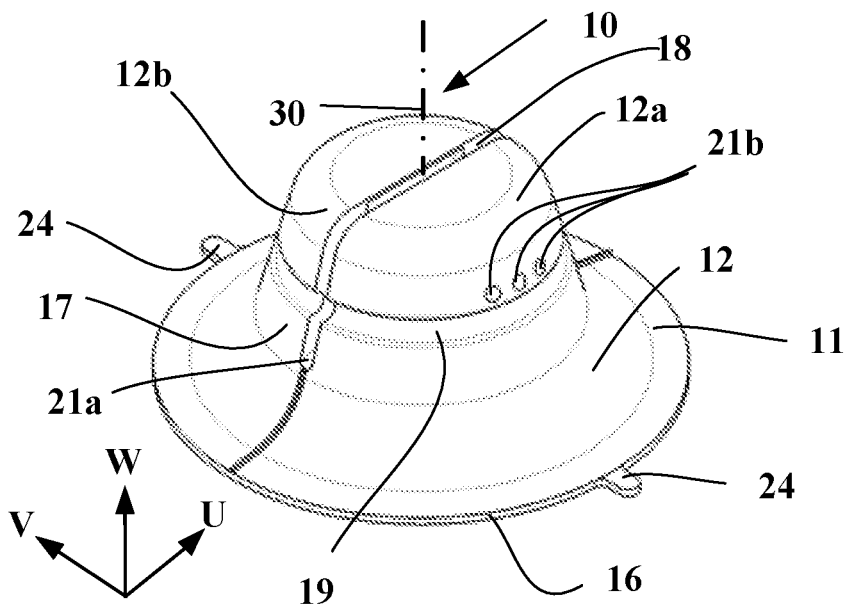
FIG. 1 is a perspective view of a securing device according to the invention.

FIG. 1 shows a securing device 10 for securing an electronic member of the TMS (Tyre Mounted System) type in a material comprising one or more compounds selected from the group comprising natural rubber, butyl, ethylene propylene diene monomer. These compounds allow the electronic member a sufficient radiofrequency communication performance in the UHF (ultrahigh frequency) bands. In addition, these compounds have natural flexibility, allowing the securing device to deform elastically.

Here, the securing device 10 has an axis of rotation 30 defining the vertical direction W in the local frame of reference of the securing device 10. It is obtained by moulding between two mainly semi-conical dies directly generating the opening 18 at the retaining wall 12.

This securing device 10 comprises a base 11 and a retaining wall 12 which together constitute the securing device 10. The retaining wall 12 is made up of two disjointed structures 12a and 12b on its upper part in the direction W with respect to the base 11. The separation between these two disjointed structures 12a and 12b is formed by the opening 18. The opening 18 can widen here in order to generate a large enough space to introduce and extract an electronic member into and from the securing device 10. This widening takes place about a natural hinge formed by certain through-orifices 21a of circular section that also serve as ends of the opening 18. The shape of these orifices 21a also makes it possible to limit the stress concentrations at the ends of the opening 18.

The retaining wall 12 here comprises several circular orifices 21a and 21b joining the external surface 17 of the retaining wall 12 to the internal surface thereof. These orifices 21a and 21b establish fluidic communication between the volume of the mounted assembly and that contained within the securing device 10.

Finally, the retaining wall 12 of the securing device 10 is equipped with a channel 19 that acts as a retaining device for a single-use clamping system of the tightenable ring type, not depicted. Specifically, in order to avoid any extraction of the electronic member through the opening 18 of the retaining wall 12, the clamping system has the essential function of holding the electronic member and the retaining wall 12 together. This retention limits, on the one hand, relative movements of the electronic member with respect to the securing device and, on the other hand, damage brought about by these knocks to the internal surfaces of the base 11 and of the retaining wall 12. The channel naturally forms a hinge allowing the relative pivoting of the upper part of the retaining wall with respect to its lower part defined with respect to the channel. This hinge facilitates the phases of extraction and insertion of the electronic member from and into the securing device 10.

At the external surface 16 of the base 11, the securing device 10 is able to be secured to the wall of tyre casing via standard means of securing elastomer products of the MS-polymer (which stands for silyl-modified polyether), MS PDMS (which stands for silyl-modified Polydimethylsiloxane) adhesive, double-sided sticky tape or tie-gum type. Finally, the vertically upper part of the base with respect to the external surface of the base here comprises, by way of markers 24, two rounded lugs situated diametrically opposite each other and extending radially outwards from the base 11. The direction corresponding to a parallel relative to the alignment of the markers 24 corresponds to the transverse direction V in the local frame of reference. Finally, the longitudinal direction U of the local frame of reference is a direction perpendicular to the alignment of the markers 24. These markers 24 allow the securing device 10 and, therefore, the electronic member, to be positioned within the tyre casing. These markers 24 are essential if the electronic member makes it possible, for example, to make a distinction between physical parameters of the mounted assembly in the axial A and circumferential S directions of the mounted assembly in instances in which the securing device 10 is placed in line with the tread of the tyre casing.

Figure 2:
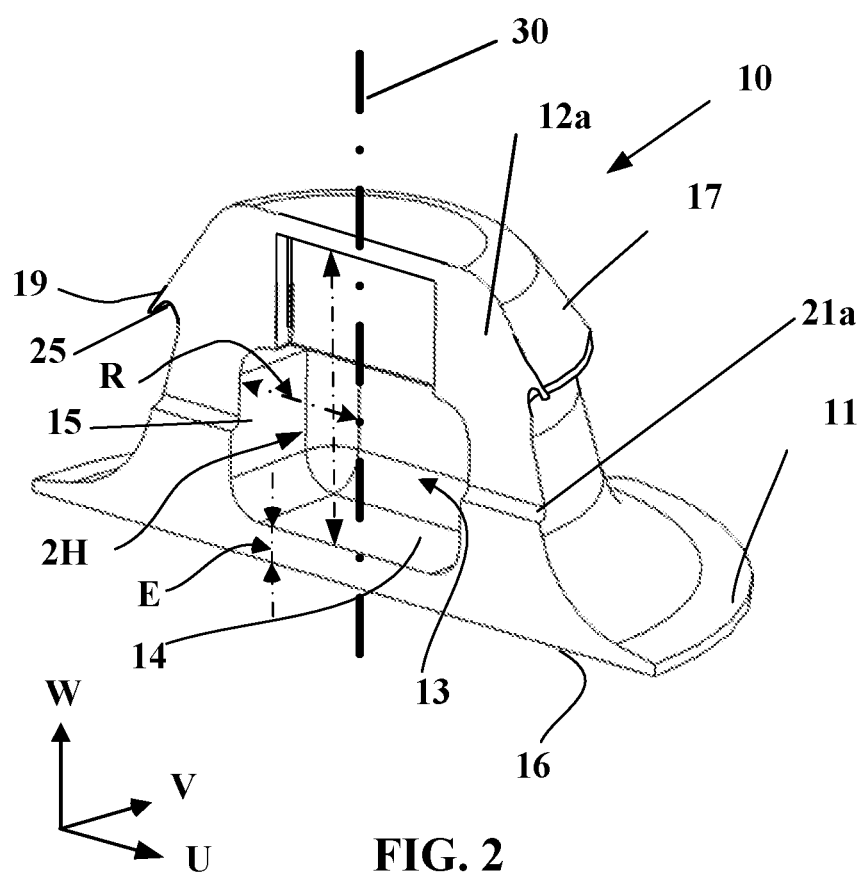
FIG. 2 is a view in perspective and in cross section of a securing device, the section being taken at the opening.

FIG. 2 shows the cross section of another securing device 10, in a similar material to the device of FIG. 1, able to be secured to a wall of a tyre casing using standard means for securing elastomer products. The section of the securing device 10 is taken in the vertical direction W at the opening the longitudinal ends of which end in through-orifices 21a of the retaining wall. In this figure, this securing device 10 has, on the one hand, a base 11 and, on the other, a disjointed structure 12a of the retaining walls. The base 11 acts as the securing interface, for securing to the wall of the tyre casing, via the external surface 16. The base 11 has a thickness E between its internal 14 and external 16 surfaces. Thus, there is mechanical decoupling between the electronic member resting on the internal surface 14 of the base 11 and the tyre casing present at the external surface 16 thereof. The space E is between 2 and 4 millimetres, here 3 millimetres.

The opening passes through the retaining wall 12 from the external surface 17 to the internal surface 15. The elastic deformation of the disjointed structure 12a of the retaining wall allows widening of the opening through which the electronic member is introduced into or extracted from the volume 13 of the securing device 10. The volume 13 is delimited by the internal surface 14 of the base 11 and the internal surface 15 of the retaining wall. This volume 13 is able to accommodate here the electronic member in a configuration that may or may not involve clearance. Thus, the volume 13 is also inscribed inside the right cylinder about an axis of rotation 30. The term "vertically upper part of the retaining wall" refers to any material point situated at a vertical distance H with respect to the internal surface 14 of the base 11. The other part of the retaining wall 12 will be incorporated into the vertically lower part.

Several orifices pass through the retaining wall 12a from the external surface 17 to the internal surface 15. These orifices allow the fluid external to the securing device 10 to be placed in communication with the fluid contained in the volume 13. In this figure orifice 21a is situated at a vertical distance away from the internal surface 14 of the base that is less than the vertical distance H. These orifices serve as a hinge for the retaining wall. The vertical positioning thereof facilitates the handling steps carried out on the electronic member. In contrast, all the orifices have an opening onto the outside of the securing device 10 that is situated at a radial distance away from the reference axis 30 that is greater than R.

In addition, the disjointed structure 12a of the retaining wall on its external surface 17 has a radially outer rib positioned in the vertically upper part which acts as a retaining device 19 for a single-use clamping system that clamps the retaining wall. This retaining device 19 is positioned radially with respect to the reference axis 30 at a distance greater than R. This radial positioning makes it possible for the disjointed structure 12a of the retaining wall to unfurl enough that the electronic member can be extracted and inserted with respect to the volume 13 internal to the securing device 10. This rib is equipped here with a cavity 25 on its vertically lower part, to accommodate the single-use clamping system, not depicted in this figure. This cavity 25 acts as a hinge between that part of the retaining wall 12 that is situated vertically above the rib and that part of the retaining wall that is situated vertically below the rib in the absence of a single-use clamping system. This hinge facilitates the unfurling of the disjointed structures 12a of the retaining wall.

Figure 3:
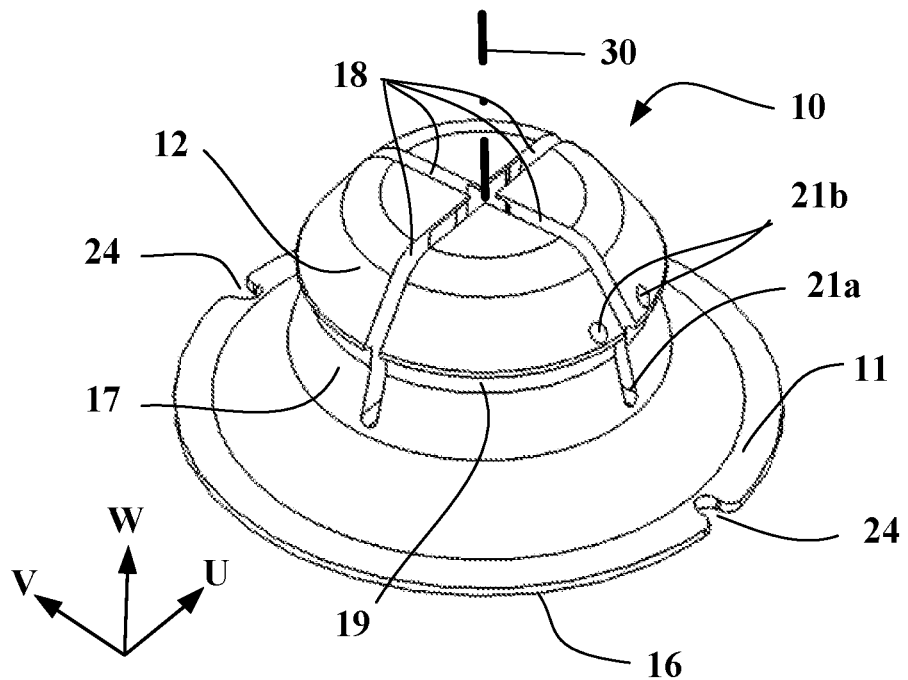
FIG. 3 is a perspective view of a securing device, the opening of which comprises two linear segments separating the retaining wall into four disjointed structures according to the invention.

FIG. 3 is a perspective view of another securing device 10. This device has an axis of rotation 30. The base 11 of the securing device 10 has diametrically opposite markers 24 in the form of a notch allowing angular positioning of the securing device 10 with respect to the wall of the tyre casing. In other forms of base 11 which do not have an axis of rotation, such as a diamond-shaped base, these markers 24 could, for example, be geometric details of the base 11, such as the corners of the diamond defining the base.

The external surface 16 of the base 11, which acts as an interface for connection with the wall of the tyre casing, is clearly distinguished. The flexible nature of the material of the securing device 10 allows the external surface 16 of the base 11 to conform to the surface of the wall of the tyre casing so as to form an effective bond between the two elements.

The retaining wall 12 firmly attached to the base 11, has an opening 18 formed from the four slots of the retaining wall 12. The opening 18 here has a width of the order of 3 millimetres. The opening 18 passes through the retaining wall 12 from its external surface 17 to its internal surface.

The retaining wall 12 also comprises, on its vertically upper part, a retaining device 19 able to accommodate within a cavity a single-use clamping system. These details are not depicted in this figure. The retaining device 19 takes the form of a discontinuous rib exhibiting symmetry of revolution about the axis of rotation 30. The discontinuities in the rib are situated at the slots of the opening 18.

The opening 18 allows the vertically upper part of the retaining wall 12 to be unfurled by means of four disjointed structures of the retaining wall 12. These disjointed parts of the retaining wall 12 are able to first of all pivot radially at the level of the cavity of the retaining device 19. The cavity of the retaining device 19, in the absence of a single-use clamping system, allows the vertically upper part of the disjointed structure of the retaining wall 12 to pivot relative to the vertically lower part of this same wall. In addition, these disjointed structures may also pivot circumferentially at the level of the ends of the opening which ends consist of the orifices 21a. These two rotations make it possible to open up enough space in the vertically upper part of the retaining wall 12 that the steps of extracting or inserting the electronic member with respect to the internal volume of the securing device 10 can be performed. In addition, the vertical position of the orifices 21a that act as the ends of the opening 18 on the one hand make it possible to free up space for handling the electronic member. On the other hand, they also make it possible to limit the mechanical deformations of the base 11, thus making it possible to guarantee that the latter remains attached to the wall of the tyre casing during the phases of handling of the electronic member. Exchanging the electronic member in the securing device 10 takes place on the tyre casing.

The vertically upper part of the retaining wall 12 also comprises through-orifices 21b that place the fluid external to the securing device 10 in communication with the fluid contained in the volume housing the electronic member.

Figure 4:
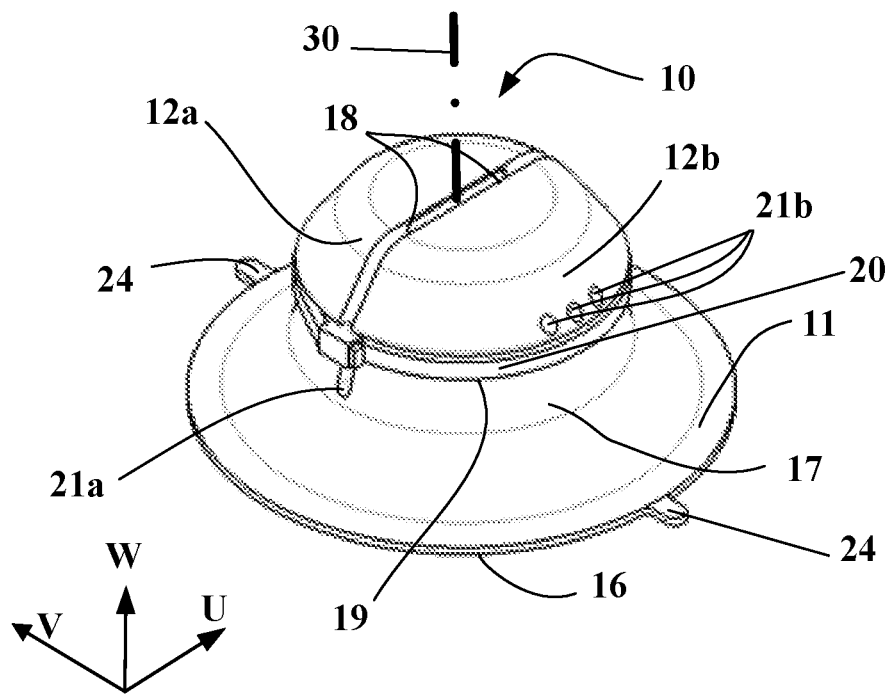
FIG. 4 is a perspective view of a securing device according to the invention in which a single-use clamping system is fitted into the retaining device.

FIG. 4 is a perspective view of another securing device 10 according to the invention exhibiting an axis of rotation 30. The securing device 10 comprises a base 11 and a retaining wall which are securely joined together.

The base 11 on its periphery has two markers 24 in the form of lugs positioned in the direction U allowing the securing device 10 to be positioned accurately with respect to the wall of the tyre casing. The securing device 10 is secured to the wall of the tyre casing via the external surface 16 of the base 11 using standard means for bonding elastomer products.

The retaining wall is made up of two disjointed structures 12a and 12b in its vertically upper part. The opening 18 serves to separate its two structures 12a and 12b. The width of the opening 18 here is of the order of 2 millimetres. The opening 18 ends in certain of the orifices 21a of the retaining wall which are situated in the vertically lower part. The positioning of these orifices 21a used as stopping points to halt the opening 18 makes it possible to obtain unfurling of the disjointed structures 12a and 12b of the retaining wall so that the steps of handling the electronic member in the securing device 10 can be performed. This is because these orifices 21a act as hinges for the disjointed structures 12a and 12b of the retaining wall. In addition, these disjointed structures 12a and 12b may also pivot radially about the cavity of the retaining device 19 of the retaining wall. This is because the retaining device 19 is produced here using a channel of rectangular section that also serves as a cavity to accommodate 50% of the rectangular cross section of the single-use clamping system 20.

Finally, certain through-orifices 21b situated on the vertically upper part of the disjointed structure 12b of the retaining wall serve to place the exterior of the securing device 10 into fluidic communication with the volume housing the electronic member. All of the through-orifices 21a and 21b have an outer end located on the external surface 17 of the retaining wall.

The single-use clamping system 20 is depicted here as a band of the cable-tie type made from a mixture of rilsan, polyamide or nylon. This band comprises a tie of rectangular section, 3 millimetres long and 1.5 millimetres wide. This band also has a tightening device making it possible on the one hand to reduce the length of the tie and on the other hand to form the ring. The tightening device is used to adjust the diameter of the band so as to bring together and retain the lips of the opening 18 situated respectively on the disjointed structures 12a and 12b of the retaining wall. The free end of the tie after the ring has been formed and adjusted, is cut off flush with the tightening device so that it does not constitute a protruding part for the walls of the tyre casing.

The adjusting of the ring leads to the narrowing of the opening 18 between the disjointed structures 12a and 12b of the retaining wall. In addition, the presence of the adjusted ring causes the hinge formed by the cavity in the retaining device 19 to be locked in position occupying the volume of this cavity, through use of the single-use clamping system 20. Thus, the pivoting of the disjointed structures 12a and 12b on the part vertically above the retaining device 19 finds itself limited thereby, not allowing the electronic member to be either extracted or inserted any longer with respect to the securing device 10 through the opening 18. As a result, the inviolability of the securing device 10 is assured. Only removal of the single-use clamping system 20, achieved by at least partially destroying same, contained in the retaining device 19 allows enough space to be created to allow the electronic member to be manipulated at the level of the securing device 10. In the case of a band of the cable-tie type, cutting the tie using a cutting blade through the fault or destroying the tightening device allows this cable tie band contained in the channel of the retaining wall to be undone.

Of course, other single-use clamping systems may also be employed, such as, for example, rings made of a thermosetting rubber from the group comprising natural rubber, butyl, nitrile and ethylene propylene diene monomer or made of heat-weldable rubber from the group including polyurethane and polyester.

The invention claimed is:

1. A device for securing an electronic member to a wall of a tire casing, the device comprising:
   a base configured to be secured to the wall of the tire casing;
   a retaining wall, connected to the base and, with the base, defining a volume delimited by interior surfaces of the base and of the retaining wall, which is able to accommodate the electronic member; and
   a clamping system for clamping the retaining wall, configured to prevent any extraction of the electronic member,
   wherein the retaining wall, which is able to deform elastically, comprises an opening that allows the electronic member to be extracted and inserted,
   wherein the retaining wall, on an external surface, has at least one retaining device for the clamping system, and
   wherein the clamping system is a single-use system.

2. The device according to claim 1, wherein, with the opening defining a lip on each disjointed structure of the retaining wall, the clamping system is able to bring together the lips of the opening at least at the at least one retaining device.

3. The device according to claim 1, wherein the retaining wall comprises N through-orifices, N being greater than or equal to 2.

4. The device according to claim 3, wherein the through-orifices have a cross section with continuous curvature.

5. The device according to claim 4, wherein any point on the cross section of a through-orifice has a radius of curvature greater than or equal to 1 mm.

6. The device according to claim 1, wherein the at least one retaining device comprises a groove or a channel.

7. The device according to claim 1, wherein the at least one retaining device is partially continuous.

8. The device according to claim 1, wherein, with the volume housing the electronic member positioned in the device being inscribed inside a right cylinder that is upright about a reference axis of height 2H with respect to the interior surface of the base and of diameter 2R, the at least one retaining device extends circumferentially with respect to the reference axis over an angular sector of at least 90 degrees.

9. The device according to claim 1, wherein, with the volume housing the electronic member positioned in the device being inscribed inside a right cylinder that is upright about a reference axis of height 2H with respect to the interior surface of the base and of diameter 2R, the at least one retaining device is situated at a radial distance greater than or equal to R away from the reference axis and at a vertical distance greater than or equal to H away from the interior surface of the base.

10. The device according to claim 1, wherein the at least one retaining device comprises a cavity able to house at least part of the clamping system that clamps the retaining wall.

11. The device according to claim 10, wherein the cavity of the at least one retaining device has a cross section that accommodates at least 40% of the cross section of the clamping system.

12. The device according to claim 1, wherein the clamping system comprises a tightenable ring.

13. The device according to claim 1, wherein the base comprises at least one marker situated on a vertically upper part of the base.

14. The device according to claim 1, wherein the device comprises an elastomer material.

* * * * *